US012572325B2

(12) United States Patent
Huang et al.

(10) Patent No.: US 12,572,325 B2
(45) Date of Patent: Mar. 10, 2026

(54) METHOD AND DEVICE FOR PLAYING SOUND EFFECTS OF MUSIC

(71) Applicant: Beijing Bytedance Network Technology Co., Ltd., Beijing (CN)

(72) Inventors: Yipeng Huang, Beijing (CN); Chaopeng Liu, Beijing (CN); Xiaoyu Zhu, Beijing (CN); Dailong Chen, Beijing (CN); Yufan Xue, Beijing (CN); Hao Huang, Beijing (CN); Xuzhou Ye, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 162 days.

(21) Appl. No.: 18/570,008

(22) PCT Filed: Aug. 22, 2022

(86) PCT No.: PCT/CN2022/114028
§ 371 (c)(1),
(2) Date: Dec. 13, 2023

(87) PCT Pub. No.: WO2023/071466
PCT Pub. Date: May 4, 2023

(65) Prior Publication Data
US 2024/0281200 A1 Aug. 22, 2024

(30) Foreign Application Priority Data

Oct. 25, 2021 (CN) .......................... 202111243312.1

(51) Int. Cl.
*G06F 3/16* (2006.01)
(52) U.S. Cl.
CPC .............. *G06F 3/165* (2013.01); *G06F 3/167* (2013.01)

(58) Field of Classification Search
CPC .................................. G06F 3/165; G06F 3/167
See application file for complete search history.

(56) References Cited

U.S. PATENT DOCUMENTS

| | | | | |
|---|---|---|---|---|
| 12,010,493 B1 * | 6/2024 | Wong | .......................... | H04S 7/40 |
| 12,089,021 B2 * | 9/2024 | Yan | .......................... | H04S 1/005 |
| 2020/0221248 A1 * | 7/2020 | Eubank | .................... | H04S 3/008 |

FOREIGN PATENT DOCUMENTS

| | | |
|---|---|---|
| CN | 104967949 A | 10/2015 |
| CN | 106155622 A | 11/2016 |

(Continued)

OTHER PUBLICATIONS

ISA China National Intellectual Property Administration, International Search Report and Written Opinion Issued in Application No. PCT/CN2022/114028, Nov. 1, 2022, WIPO, 11 pages.

(Continued)

*Primary Examiner* — Haoshian Shih
(74) *Attorney, Agent, or Firm* — Alleman Hall LLP

(57) ABSTRACT

The embodiments of the present disclosure relate to the technical field of computer processing. Provided are a method and device for playing a sound effect of music, and an electronic device, a computer-readable storage medium, a computer program product and a computer program. The method comprises: receiving a first operation instruction from a first interface, wherein the first interface comprises an interface for playing music in a music player; and in response to the first operation instruction, playing a sound effect of a piece of target music, wherein the sound effect comprises an associated audio sound effect and visual sound effect. By means of the embodiments of the present disclosure, when a user plays music, an audio sound effect and a visual sound effect, which are associated with the music, can be provided for the user, thereby improving the diversity of music for playing.

17 Claims, 4 Drawing Sheets

(56)      References Cited

FOREIGN PATENT DOCUMENTS

| | | | |
|----|-----------|---|---------|
| CN | 106571149 | A | 4/2017 |
| CN | 109302538 | A | 2/2019 |
| CN | 110972053 | A | 4/2020 |
| CN | 111741366 | A | 10/2020 |
| CN | 112019994 | A | 12/2020 |
| CN | 112215963 | A | 1/2021 |
| CN | 113190156 | A | 7/2021 |
| CN | 113971013 | A | 1/2022 |

OTHER PUBLICATIONS

China National Intellectual Property Administration, Office Action and Search Report Issued in Application No. 202111243312.1, May 16, 2023, 12 pages.

* cited by examiner

METHOD AND DEVICE FOR PLAYING SOUND EFFECTS OF MUSIC

CROSS-REFERENCE TO RELATED APPLICATION(S)

This application is a national stage application filed under 35 U.S.C. 371 based on International Patent Application No. PCT/CN2022/114028, filed on Aug. 22, 2022 which claims priority to Chinese Patent Application No. 202111243312.1, filed on Oct. 25, 2021, the disclosures of which are incorporated herein by reference in its entirety herein by reference.

FIELD

Examples of the disclosure relate to the technical field of computer processing, and particularly relate to a method and device for playing a sound effect of music, an electronic device, a computer-readable storage medium, a computer program product and a computer program.

BACKGROUND

When using an electronic device, users are generally required to use applications installed in the electronic device, such as applications that may play music. In embodiments of the present disclose, applications, web pages, etc. that may play music are collectively referred to as music players. Users may select music from the music players and play the selected music. The music herein may be music downloaded from the music players, local music, or music shared from social software.

How to increase diversity of music playback is an urgent problem to be solved.

SUMMARY

Embodiments of the present disclosure provide a method and device for playing a sound effect of music, an electronic device, a computer-readable storage medium, a computer program product and a computer program, which can increase diversity of music playback.

In a first aspect, an embodiment of the present disclosure provides a method for playing a sound effect of music. The method includes:

receiving a first operation instruction on a first interface, wherein the first interface includes an interface configured to play music in a music player; and playing a sound effect of target music in response to the first operation instruction, wherein the sound effect includes an associated audio sound effect and visualized sound effect.

In a second aspect, an embodiment of the present disclosure provides an apparatus for playing a sound effect of music. The apparatus includes:

a first operation instruction receiving module, which is configured to receive a first operation instruction on a first interface, wherein the first interface includes an interface configured to play music in a music player; and a sound effect playing module, which is configured to play a sound effect of target music in response to the first operation instruction, where the sound effect includes an associated audio sound effect and visualized sound effect.

In a third aspect, an embodiment of the present disclosure provides an electronic device. The electronic device includes at least one processor and a memory; wherein the memory stores computer-executable instructions; and the at least one processor executes the computer-executable instructions stored in the memory, so as to cause the electronic device to implement the method as described in the first aspect.

In a fourth aspect, an embodiment of the present disclosure provides a computer-readable storage medium. The computer-readable storage medium stores computer-executable instructions, wherein a processor, when executes the computer-executable instruction, causes an electronic device to implement the method as described in the first aspect.

In a fifth aspect, an embodiment of the present disclosure provides a computer program product. The computer program product includes a computer program, wherein the computer program, when being executed by a processor, implements the method as described in the first aspect.

In a sixth aspect, an embodiment of the present disclosure provides a computer program. The computer program is configured to implement the method as described in the first aspect.

Embodiments of the present disclosure provide a method and device for playing a sound effect of music, an electronic device, a computer-readable storage medium, a computer program product and a computer program. The method includes: receiving a first operation instruction on a first interface, wherein the first interface includes an interface configured to play music in a music player; and playing a sound effect of target music in response to the first operation instruction, wherein the sound effect includes an associated audio sound effect and visualized sound effect. According to the embodiments of the present disclosure, when a user plays music, the audio sound effect and visualized sound effect associated with the music can be provided for the user, such that diversity of music playing is increased.

BRIEF DESCRIPTION OF THE DRAWINGS

In order to describe technical solutions in embodiments of the present disclosure or in the related art more clearly, accompanying drawings required to be used in the description of the embodiments or the related art will be briefly introduced below. Apparently, the accompanying drawings in the following description show some embodiments of the present disclosure, and those of ordinary skill in the art would also be able to derive other accompanying drawings from these accompanying drawings without making any creative effort.

DETAILED DESCRIPTION OF EMBODIMENTS

In order to make the objective, technical solutions and advantages of embodiments of the disclosure more obvious, the technical solutions according to embodiments of the present disclosure will be clearly and completely described below in combination with accompanying drawings according to embodiments of the present disclosure. Apparently, the described embodiments are some e embodiments, rather than all embodiments of the present disclosure. Based on examples of the present disclosure, all other embodiments obtained by those of ordinary skill in the art without making creative efforts fall within the scope of protection of the present disclosure.

Figure 1:
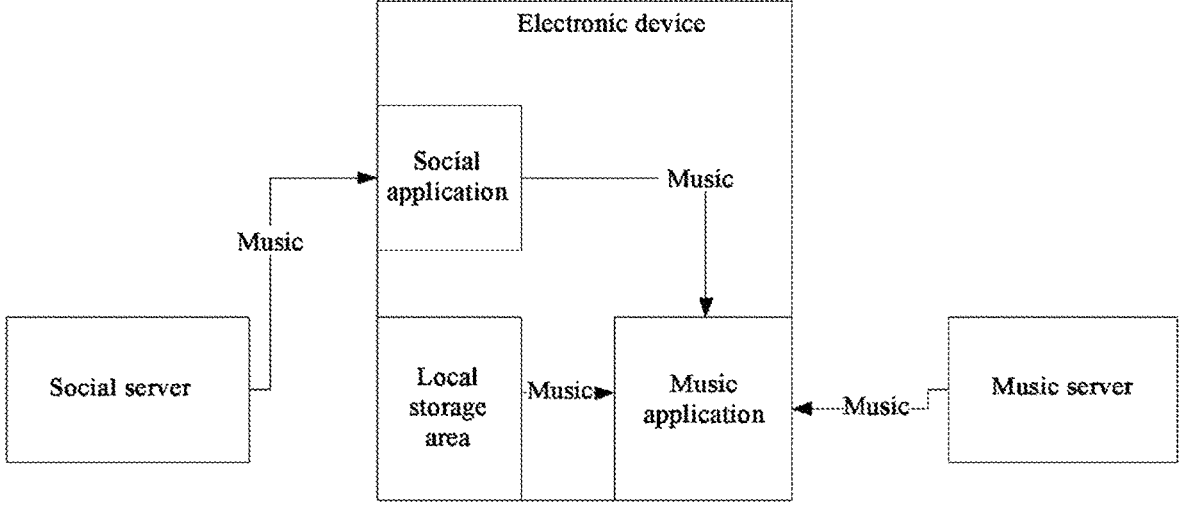
FIG. 1 is a schematic diagram of a scenario of music playback to which an embodiment of the present disclosure is applicable.

Embodiments of the present disclosure may be applied to scenarios of music playback. FIG. 1 is a schematic diagram of a scenario of music playback to which an embodiment of the present disclosure is applicable. With reference to FIG. 1, a music application is installed on an electronic device and configured to play music including audio music and/or music for videos.

It can be seen from FIG. 1 that the above music application may acquire music from a corresponding music server and play the acquired music, may acquire music from a local storage area and play the acquired music, or may acquire music from a social application and play the acquired music.

The social application is configured to share data such as images, text, audio, and video. That is, a social application may implement data transmission with another social application by means of a social server or directly implement data transmission with the social server. Certainly, in an embodiment of the present disclosure, data transmitted by the social server is data related to music.

In the related art, during the above music playback process, the music application generally calls a speaker of the electronic device to play music, and a user can enjoy the music through sounds.

However, the above process can only provide an original effect of the music for the user, which is relative simple, reducing diversity of music playback.

In order to solve the above problems, in a process of playing music by a user, not only music may be played, but also a sound effect corresponding to the music may be played. The sound effect includes an audio sound effect and a visualized sound effect. In this way, when a user plays music, an audio sound effect and visualized sound effect associated with the music can be provided for the user, such that diversity of music playing is increased.

Technical solutions of embodiments of the present disclosure and how the technical solutions of the present disclosure solve the above technical problems are described in detail below with particular embodiments. The following several particular embodiments may be combined with each other, and the same or similar concepts or processes may not be repeated in some embodiments. Embodiments of the present disclosure will be described below in combination with accompanying drawings.

Figure 2:
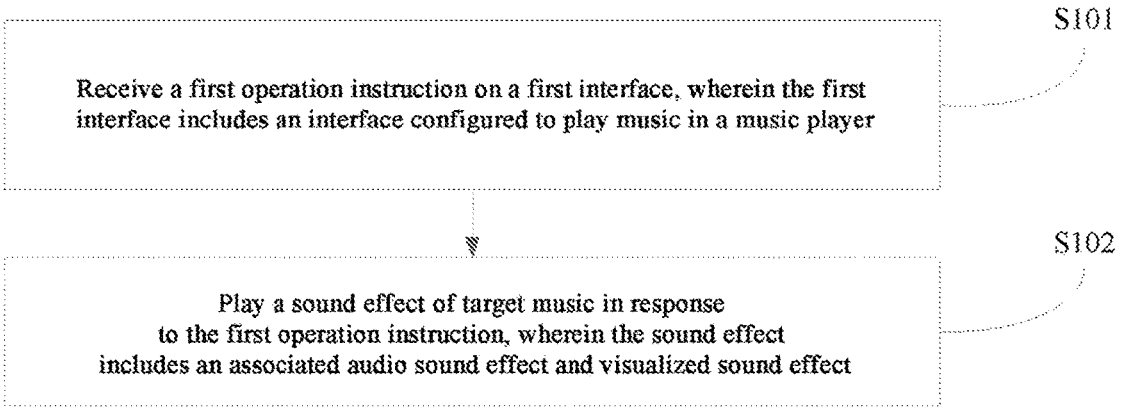
FIG. 2 is a flowchart of steps of a method for playing a sound effect of music according to an embodiment of the present disclosure.

FIG. 2 is a flowchart of steps of a method for playing a sound effect of music according to an embodiment of the present disclosure. The method shown in FIG. 2 may be applied to an electronic device. With reference to FIG. 2, the method for playing a sound effect of music may include:

S101: receive a first operation instruction on a first interface, wherein the first interface includes an interface configured to play music in a music player.

The music player may include at least one of an application configured to play music and a web page configured to play music.

The above music player may provide multiple types of interfaces, so as to implement different operations on the music player and/or music. For instance, the multiple types of interfaces may include, but are not limited to, an interface configured to manage user information, an interface configured to play music, and an initial interface configured to recommend music to a user.

The above multiple types of interfaces may be switched between each other. For instance, when the music player displays an interface P1, a user may switch P1 to an interface P2 by clicking a tab of the interface P2 that has been displayed.

Figure 3:
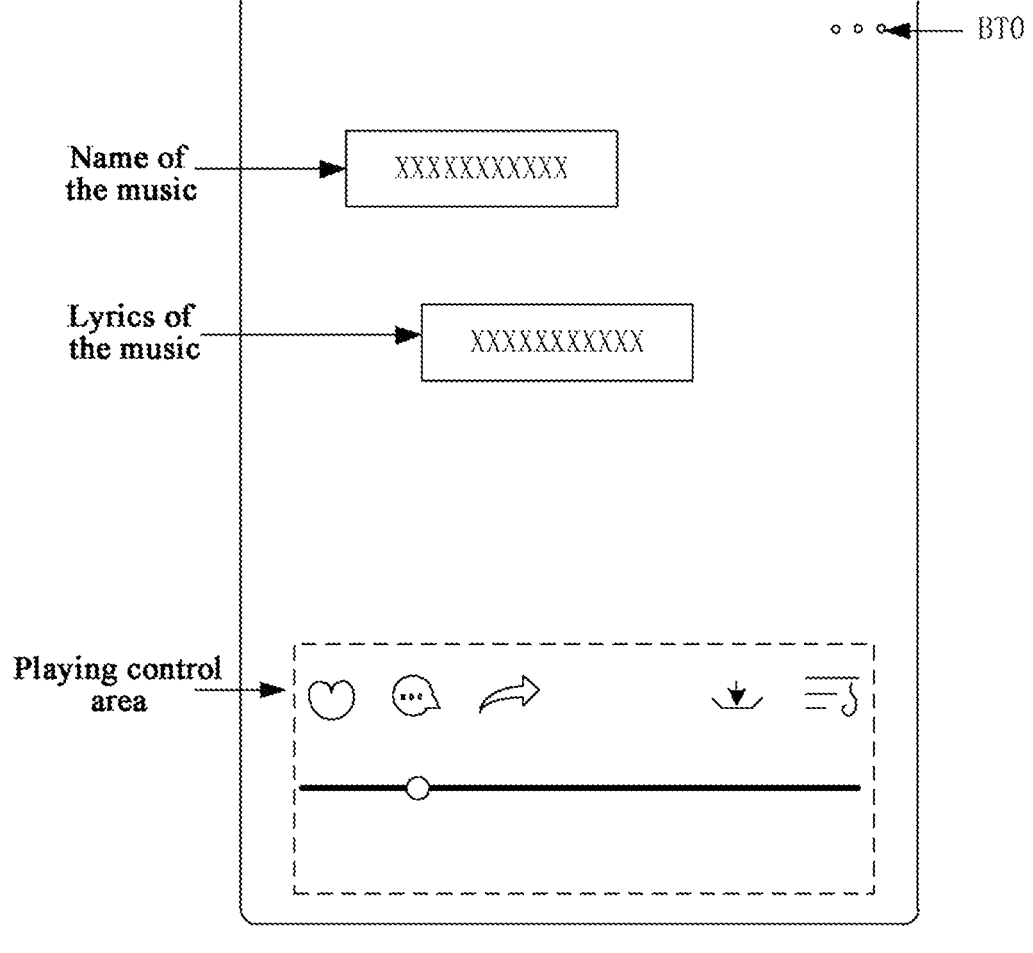
FIG. 3 is a schematic structural diagram of a first interface according to an embodiment of the present disclosure.

FIG. 3 is a schematic structural diagram of a first interface according to an embodiment of the present disclosure. With reference to FIG. 3, the first interface includes an operation control BT0, name of the music, lyrics of the music, and a playing control area.

The operation control BT0 is configured to enter into a setting interface, such that more settings may be made on music that is being played.

The playing control area may be configured to implement playing control on music, which includes, but is not limited to, adjusting progress of music that is being played, collecting music, evaluating music, forwarding music, downloading music and selecting a loop mode.

The first operation instruction on the first interface may be any instruction input by the user on the above first interface. The first operation instruction may include, but is not limited to, a sliding operation instruction on the first interface and an operation instruction for a designated operation control on the first interface.

In a case that the first operation instruction includes the sliding operation instruction on the first interface, a direction and/or position of the sliding operation instruction may be further limited, to avoid turn-on of a sound effect caused by a mis-operation. For instance, it is determined that the sliding operation instruction is the first operation instruction in a case that the sliding operation instruction is oriented to a preset direction. For another instance, it is determined that the sliding operation instruction is the first operation instruction in a case that the sliding operation instruction is within a preset area of the first interface. Certainly, the direction and the position may be combined in order to further avoid a mis-operation. That is, it is determined that the sliding operation instruction is the first operation instruction in a case that the sliding operation instruction is oriented to the preset direction and within the preset area.

In a case that the first operation instruction includes an operation instruction for a designated operation control on the first interface, an operation mode for the operation control may be further limited to avoid turn-on of a sound effect caused by a mis-operation. For instance, if a double click on the operation control is determined as the first operation instruction, the remaining instructions on the operation control are not taken as the first operation instruction. The remaining instructions may be a click, a long press, etc.

In the related art, the user is required to enter into at least one intermediate interface from the first interface first, and then turn on the sound effect on the intermediate interface.

In an embodiment of the disclosure, when music is played, the user is only required to implement the first operation instruction once to turn on the sound effect. Therefore, a number of operations required to be implemented when the user turns on the sound effect is reduced, which is conducive to reduction in operation complexity of turning on the sound effect by the user. Moreover, since it is not required to display the intermediate interface in an embodiment of the disclosure, time required to be consumed by the intermediate interface can be saved, and accordingly, time spent by the user can be saved.

In addition, the sound effect according to an embodiment of the present disclosure includes an associated audio sound effect and visualized sound effect, such that the audio sound effect and the visualized sound effect may be turned on simultaneously through one-time operation, and operation complexity is further reduced.

S102: play a sound effect of target music in response to the first operation instruction, wherein the sound effect includes an associated audio sound effect and visualized sound effect.

It can be understood that the step of playing a sound effect of target music is to play the sound effect while the target music is played, and the sound effect is a sound effect associated with the target music, such that an effect heard by the user is an effect of the target music with the sound effect is added. Alternatively, the target music and the sound effect may be played in a music player.

The audio sound effect of the above sound effect is not required to be displayed, and only required to be played by calling an audio playing interface. The above visualized sound effect is required to be displayed on a second interface, and the visualized sound effect is a dynamic effect changing with the audio sound effect, such that a display process of the visualized sound effect may also be understood as a playing process.

Figure 4:
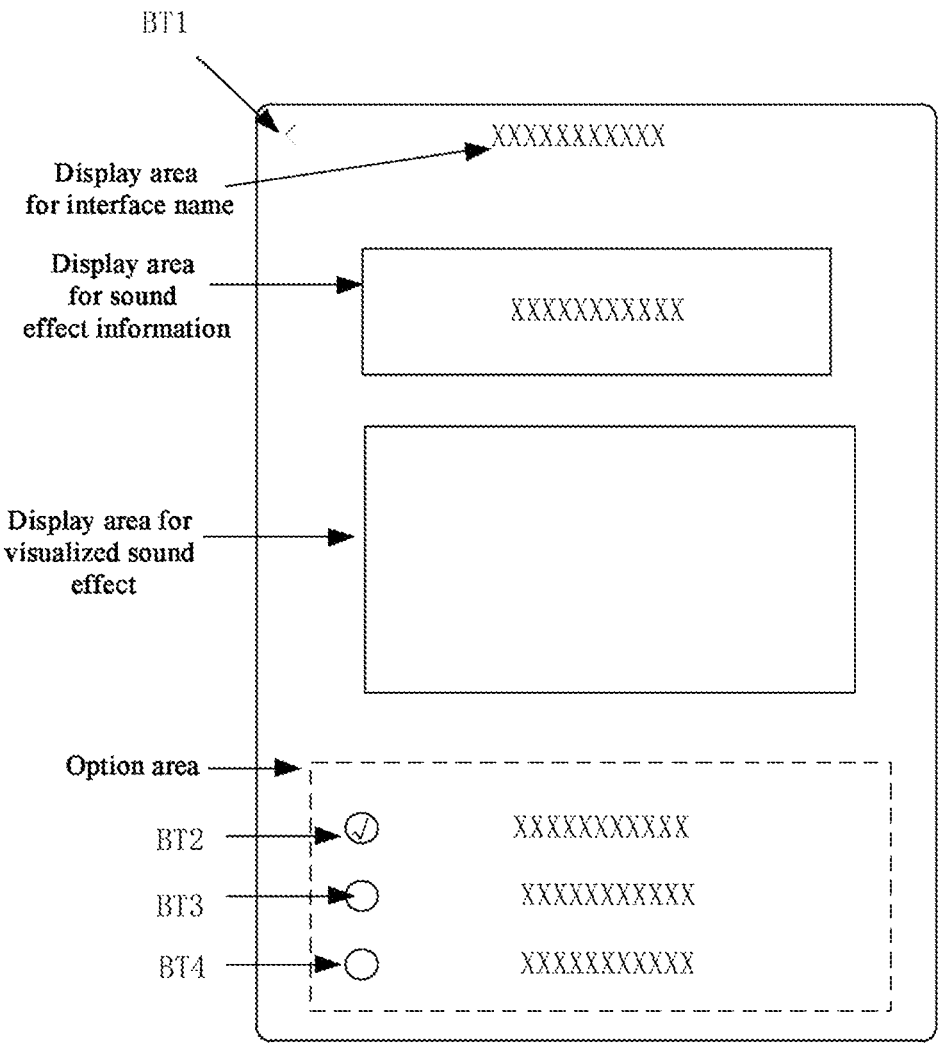
FIG. 4 is a schematic structural diagram of a second interface according to an embodiment of the present disclosure.

FIG. 4 is a schematic structural diagram of a second interface according to an embodiment of the present disclosure. With reference to FIG. 4, the second interface includes BT1, a display area for interface name, a display area for sound effect information and a display area for visualized sound effect.

BT1 is configured to close the second interface. A user may return to the first interface after the second interface is closed.

The above display area for interface name is configured to display a name of the second interface, and an interface name may be "sound effect interface".

The above display area for sound effect information is configured to display detailed information of a sound effect, which may include, but is not limited to, a sound effect name and an introduction of the sound effect. The sound effect may be understood as a sound effect group including an audio sound effect and a visualized sound effect, accordingly, the detailed information of the sound effect is configured to describe the sound effect group.

The above display area for visualized sound effect is configured to display the visualized sound effect, and the visualized sound effect may be a sound effect represented by any visualized effect. The visualized sound effect is dynamically changing, and the changing process corresponds to the audio sound effect. For instance, the audio sound effect acoustically reminds the user that there is a bass effect at a certain moment, and the visualized sound effect visually prompts the user that there is the bass effect at the moment.

In an embodiment of the disclosure, the above visualized sound effect may be three-dimensional. In the related art, the visualized sound effect is two-dimensional. Compared with the related art, the three-dimensional visualized sound effect may further improve a visualized sense of space. In a case that the audio sound effect is a stereoscopic auditory effect for a space angle, the visualized sound effect is a three-dimensional visualized effect for the space angle.

In the remaining scenarios in the related art, it is generally required to implement complex computation based on three directions in order to visually achieve a three-dimensional effect. In an embodiment of the present disclosure, a visually three-dimensional effect may be simulated through simple overlap of display units in order to reduce computational complexity. Specifically, the three-dimensional visualized sound effect may include at least two types of display units that are displayed in an overlapping manner, wherein the display units have different directions of movement, and each of the display units includes at least one pixel.

The at least one pixel included in one display unit may be adjacent to each other or not. For instance, adjacent pixels may form a solid dot to serve as a display unit.

During a practical application, directions of movement of at least three movement units have corresponding components at three coordinate axes, such that three display units may simulate a three-dimensional effect. Orientations have movement components on different coordinate axes.

It can be seen that in the above process, it is only required to control different display units to move towards different directions of movement to achieve a three-dimensional effect, and computational complexity is low.

A visualized sound effect formed by the above at least two display units that display in an overlapping manner may include at least one of a moving displayed object or a twinkling displayed object.

The displayed object may include one or more display units, and each display unit may include one or more pixels, such that each displayed object also includes one or more pixels.

During a practical application, a movement direction of the above moving displayed object may be fixed or not. In a case that the movement direction is fixed, the above moving displayed object may be configured to simulate a falling meteor. In a case that the movement direction is not fixed, the movement direction may be configured to simulate a tilt direction of the electronic device. For instance, when the user tilts the electronic device downwards and forwards, a displayed object moving upwards may be displayed in the display area for visualized sound effect. When the user tilts the electronic device backwards, a displayed object moving downwards may be displayed in the display area for visualized sound effect. When the user tilts the electronic device downwards and leftwards, a displayed object moving leftwards may be displayed in the display area for visualized sound effect. When the user tilts the electronic device downwards and rightwards, a displayed object moving rightwards may be displayed in the display area for visualized sound effect.

The above twinkling displayed object may include a pixel having constantly changing brightness, which is configured to simulate a twinkling light source. Each displayed object may be a light source, the visualized sound effect may include multiple light sources, and the multiple light sources may be displayed at any position in the display area for visualized sound effect in FIG. 4. For instance, these light sources may be located at a vertex of the display area for visualized sound effect.

In a first instance according to an embodiment of the present disclosure, the above target music is music that is being played. That is, the user may implement the first operation instruction while the target music is being played on the first interface of the music player. Therefore, the music player plays the sound effect of the target music when continuing to play a subsequent segment of the target music. In such a scenario, since before the first operation instruction is implemented, the target music played by the music player is an effect before the sound effect is added, after the first operation instruction is implemented, the target music played by the music player is an effect after the sound effect is added. In this way, the user may feel a difference between the target music after the sound effect is added and before the sound effect is added, and the user is assisted in feeling the sound effect more accurately.

In a second instance of an embodiment of the present disclosure, the above target music is music that is suspended from being played. That is, before the user implements the first operation instruction, the music player does not play music, but has music that is suspended from being played. After the user implements the first operation instruction, the music player starts to play the music that is previously suspended from being played and a corresponding sound effect. Specifically, the music that is suspended from being played is determined as the target music in response to the first operation instruction, and the target music and a sound effect of the target music are played.

It can be understood that since the music that is suspended from being played is music to which a user latest listens, the user has a clear memory for the music. Since the sound effect is added to the music that is suspended from being played, the user can better compare effects before and after the sound effect is added.

The sound effect of the target music may be played after the above music that is suspended from being played is determined as the target music. Specifically, firstly, a target segment of the target music is determined, wherein the target segment includes an unplayed music segment of the target music and a played music segment of the target music; and then the target segment of the target music and a sound effect corresponding to the target segment are played.

In a case that the target segment includes the unplayed music segment of the target music, the music can be prevented from being repeatedly played to the user, which is can improve user's experiences.

In a case that the target segment includes the played music segment of the target music, the user has listened to an effect of a played music segment to which a sound effect is not added. Therefore, by playing an effect of the played music segment to which the sound effect is added, the user is facilitated to compare a difference before and after the sound effect is added.

It can be seen that the above visualized sound effect may be displayed on the second interface of the music player, such that the user can close the second interface when the sound effect is played. Since before the first operation instruction is implemented, the target music is suspended from being played, after the second interface is closed, the target music may be suspended from being played. In this way, it can be ensured that a state of the target music is consistent before and after the sound effect is played.

Alternatively, a sound effect may further be selected for the target music before the target segment of the target music and the sound effect corresponding to the target segment are played. Specifically, firstly, a music feature of the target segment is determined; and then, a sound effect matching the music feature is acquired from at least two preset sound effects and determined as the sound effect of the target segment.

The music feature may include a voice feature, a bass feature, an instrument feature, a genre, audio of different channels, or any combination thereof.

The above bass feature may include, but is not limited to, a frequency of occurrence of bass, and a total time of occurrence of bass. Therefore, a sound effect for bass is selected for target music on which bass occurs more, and the sound effect for bass may not be selected for target music on which bass occurs less.

The above instrument feature may include, but is not limited to, an instrument type, a music segment corresponding to the instrument type and a main instrument type. Specifically, for a music segment corresponding to each type of an instrument, a sound effect matching the instrument type may be added. For the main instrument type, a sound effect matching the main instrument type may be taken as a sound effect of the target music.

The above genre may include, but is not limited to, pop, electronic music, hip-hop, jazz, rap, ancient music, Chinese style music, rock and roll and country music. It can be understood that a sound effect adapted to each genre may be different, and a relationship between the genre and the sound effect may be preset.

Certainly, in practical applications, a sound effect corresponding to the target music may be determined by combining the above multiple types of music features.

In the related art, after a user selects a sound effect, all music is played with the sound effect. However, in an embodiment of the present disclosure, different sound effects may be determined for target music having different music features, which further increases flexibility and diversity of a sound effect.

Certainly, when the user is not satisfied with the sound effect adapted to the music feature, the user may cancel the sound effect to manually select a sound effect. In this way, flexibility and diversity of a sound effect may be taken into account. Moreover, by combining requirements of users, the method is suitable for users who are proficient in a music feature.

In a case that the above music feature includes audio of different channels, firstly, first pieces of sub-audio corresponding to multiple space angles are determined according to the target music, wherein one space angle corresponds to one first piece of sub-audio. Then, each first piece of sub-audio is input into a filter corresponding to the space angle which is corresponding to the first piece of sub-audio, such that a second piece of sub-audio of the space angle is obtained, wherein the second piece of sub-audio is configured to simulate playing effects at the space angle, and a piece of preset audio has audio features corresponding to the playing effects at the space angle. Finally, a synthetic sound effect is generated by means of multiple second pieces of sub-audio and is played.

A number of the above space angles may be flexibly set and is configured to determine a number of the first pieces of sub-audio and the second pieces of sub-audio. The above different filters are configured to convolve pieces of preset standard audio respectively corresponding to the space angles with the corresponding first piece of sub-audio, such that the second sub-audio is obtained. For instance, there are 5 space angles including: a front-left direction, a front-right direction, a rear-left direction, a rear-right direction, and a front direction of a user, which correspond to first pieces of sub-audio $V11$, $V12$, $V13$, $V14$ and $V15$ respectively, and correspond to pieces of preset front-left audio V01, preset front-right audio V02, preset rear-left audio V03, preset rear-right audio V04 and preset front audio V05, respectively.

Filter F1 corresponding to a first piece of sub-audio V11 may convolve V11 with a piece of preset front-left audio V01, such that a corresponding second piece of sub-audio V21 is obtained, and an effect of implementing playing music at the front-left direction of the user is simulated. Specifically, in a case that V01 includes left-channel audio VL01 and right-channel audio VR01, F1 includes two sub-filters F11 and F12. Filter F11 is configured to convolve V11 with VL01, such that left-channel audio VL21 of V21 is obtained; and filter F12 is configured to convolve V11 with VR01, such that right-channel audio VR21 of V21 is obtained.

Filter F2 corresponding to a first piece of sub-audio V12 may convolve V12 with a piece of preset front-right audio V02, such that a corresponding second sub-audio V22 is obtained, and an effect of implementing playing music at the front-right direction of the user is simulated. Specifically, in a case that V02 includes left-channel audio VL02 and right-channel audio VR02, F2 includes two sub-filters F21 and F22. Filter F21 is configured to convolve V12 with VL02, such that left-channel audio VL22 of V22 is obtained. Filter F22 is configured to convolve V12 with VR02, such that right-channel audio VR22 of V22 is obtained.

Filter F3 corresponding to a first piece of sub-audio V13 may convolve V13 with a piece of preset rear-left audio V03, such that a corresponding second piece of sub-audio V23 is obtained, and an effect of implementing playing music at the rear-left direction of the user is simulated. Specifically, in a case that V03 includes left-channel audio VL03 and right-channel audio VR03, F3 includes two sub-filters F31 and F32. Filter F31 is configured to convolve V13 with VL03, such that left-channel audio VL23 of V23 is obtained. Filter F32 is configured to convolve V13 with VR03, such that right-channel audio VR23 of V23 is obtained.

Filter F4 corresponding to a first piece of sub-audio V14 may convolve V14 with a piece of preset rear-right audio V04, such that a corresponding second piece of sub-audio V24 is obtained, and an effect of implementing playing music at the rear-right direction of the user is simulated. Specifically, in a case that V04 includes left-channel audio VL04 and right-channel audio VR04, F4 includes two sub-filters F41 and F42. Filter F41 is configured to convolve V14 with VL04, such that left-channel audio VL24 of V24 is obtained; and filter F42 is configured to convolve V14 with VR04, such that right-channel audio VR24 of V24 is obtained.

Filter F5 corresponding to a first piece of sub-audio V15 may convolve V15 with a preset piece of front audio V05, such that a corresponding second piece of sub-audio V25 is obtained, and an effect of implementing playing music at the front direction of the user is simulated. Specifically, in a case that V05 includes left-channel audio VL05 and right-channel audio VR05, F5 includes two sub-filters F51 and F52. Filter F51 is configured to convolve V15 with VL05, such that left-channel audio VL25 of V25 is obtained; and filter F52 is configured to convolve V15 with VR05, such that right-channel audio VR25 of V25 is obtained.

The above first pieces of sub-audio are determined according to the target music and corresponds to the space angles. A first piece of sub-audio may be left-channel audio of the target music, right-channel audio of the target music, a sum of the left-channel audio and the right-channel audio, and a piece of audio after performing a target processing on a difference between the left-channel audio and the right-channel audio. The above target processing may include, but is not limited to, phase inversion, time delay, all-pass filtration and decoupling. For instance, a first piece of sub-audio corresponding to the above front-left space angle may be the left-channel audio of the target music. A first piece of sub-audio corresponding to the above front-right space angle may be the right-channel audio of the target music. A first piece of sub-audio corresponding to the above front space angle may be a sum of the left-channel audio and the right-channel audio of the target music. A first piece of sub-audio corresponding to the above rear-left space angle may include audio obtained after a difference between the left-channel audio and the right-channel audio of the target music is subjected to time delay, all-pass filtration and decoupling. The first piece of sub-audio corresponding to the above rear-left space angle may include audio obtained after a difference between the left-channel audio and the right-channel audio of the target music is subjected to phase inversion, time delay, all-pass filtration and extremely-low frequency removal.

It can be seen that the above synthetic sound effect is an audio sound effect. The synthetic sound effect has an acoustically sense of space. Correspondingly, the sense of space may also be visually reflected through a corresponding visualized sound effect. Specifically, the visualized sound effect is displayed according to the space angle, and the visualized sound effect is configured to simulate relationships between the second piece of sub-audio and the space angle.

An attribute of the above visualized sound effect may also change with a tilt state of the electronic device. The tilt state of the electronic device includes, but is not limited to, a state of tilting in any direction. For instance, a state of tilting forwards, a state of tilting backwards, a state of tilting rightwards and a state of tilting leftwards. The attribute of the visualized sound effect may include, but is not limited to, a position, a shape, etc. For instance, the visualized sound effect may move upwards when a phone is tilted forwards, and move downwards when the phone is tilted backwards.

Certainly, the visualized sound effect may further be flipped in a case of having a large tilt angle or when moving to an edge of the display area for visualized sound effect. For instance, the visualized sound effect is flipped leftwards and rightwards when moving to a left edge of the display area for visualized sound effect. For another instance, the visualized sound effect is flipped upwards and downwards when moving to a lower edge of the display area for visualized sound effect.

It should be noted that the step of playing a sound effect of target music mentioned according to an embodiment of the present disclosure is a process of auditioning the sound effect. During practical applications, if a user is satisfied with the sound effect, the sound effect may be determined to be implemented. After being implemented, the sound effect will still be played along with music even if the user closes the second interface. The music herein may be not only the target music of which the sound effect is auditioned, but also any other music.

Since the above sound effect includes the audio sound effect and the visualized sound effect, the audio sound effect and/or visualized sound effect may be implemented according to different operations. Specifically, it is determined to implement the audio sound effect upon reception of a second operation instruction. It is determined to implement the visualized sound effect upon reception of a third operation instruction. It is determined to implement the audio sound effect and the visualized sound effect upon reception of a fourth operation instruction.

The above first operation instruction, second operation instruction and third operation instruction may be operation instructions for different operation controls. With reference to FIG. 4, there are three operation controls BT2, BT3 and BT4 in an option area of the second interface, and there is an option description for the operation control on a right side of each operation control respectively. For instance, in a case that BT2 is configured to implement an audio sound effect and a visualized sound effect of a sound effect that is being played, text on the right side of BT2 may be "Use audio sound effect and visualized sound effect". In a case that BT3 is configured to implement an audio sound effect of a sound effect that is being played, text on the right side of BT3 may be "Use audio sound effect". In a case that BT4 is configured to implement a visualized sound effect of a sound effect that is being played, text on the right side of BT4 may be "Use visual sound effect". It can be seen that in FIG. 4, BT2 is selected, such that the audio sound effect and the visualized sound effect are implemented simultaneously.

It can be seen from the above process that an embodiment of the present disclosure provides multiple types of implementation strategies for users. On the one hand, a user may select to implement an audio sound effect and a visualized sound effect in one click, such that complexity of operation performed by the user can be reduced when the user is required to implement the audio sound effect and the visualized sound effect simultaneously. On the other hand, the user can only implement the audio sound effect or the visualized sound effect, such that flexibility of implementation is increased.

There are two types of display strategies in the option area in FIG. 4, and an embodiment of the present disclosure does not limit which display strategy is specifically employed.

In a first display strategy, the option area may be displayed by default after the second interface is shown. Such a strategy can reduce a number of operations performed by the user and reduce complexity of operations performed by the user.

In a second display strategy, the option area is not displayed after the second interface is shown, and the option area is displayed after the user implements a triggering operation on the second interface. Through such a strategy, the user may trigger display of the option area only when the user is satisfied with a sound effect, which saves a display space of the second interface.

Certainly, if the user is not satisfied with the auditioned sound effect, the user may switch to the remaining sound effects on the second interface, and the sound effect that is previously auditioned but not implemented will be suspended from being played. For instance, the user may implement a sliding operation rightwards on the second interface in FIG. 4 to switch to a next sound effect. As another instance, the user may implement a slide operation leftwards on the second interface in FIG. 4 to switch to a previous sound effect.

It should be noted that when the user switches to the next sound effect or the previous sound effect, the sound effect after a switch, which includes an audio sound effect and a visualized sound effect, is automatically played, and the user is not required to implement an operation again.

Figure 5:
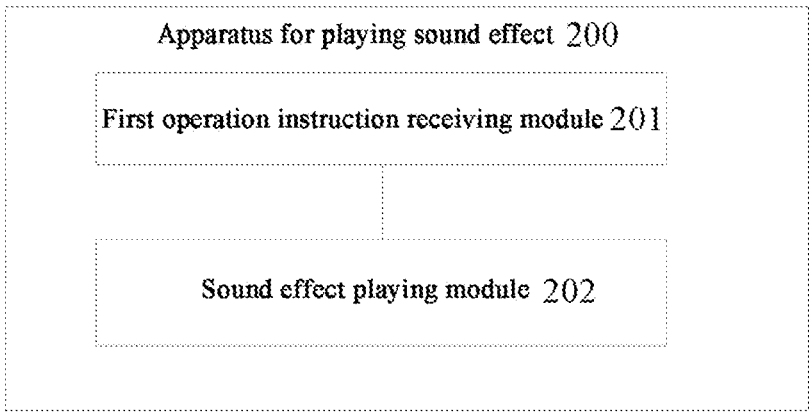
FIG. 5 is a structural block diagram of an apparatus for playing a sound effect of music according to an embodiment of the present disclosure.

Corresponding to the method for playing a sound effect of music in the above embodiment, FIG. 5 is a structural block diagram of an apparatus for playing a sound effect of music according to an embodiment of the present disclosure, which is applied to the above system for playing a sound effect of music. For ease of description, only portions relevant to embodiments of the present disclosure are shown. With reference to FIG. 5, the above apparatus 200 for playing a sound effect of music includes a first operation instruction receiving module 201 and a sound effect playing module 202.

The first operation instruction receiving module 201 is configured to receive a first operation instruction on a first interface, wherein the first interface includes an interface configured to play music in a music player.

The sound effect playing module 202 is configured to play a sound effect of target music in response to the first operation instruction, wherein the sound effect includes an associated audio sound effect and visualized sound effect.

Alternatively, the sound effect playing module 202 is further configured to:

determine music that is suspended from being played as the target music in response to the first operation instruction; and play the target music and a sound effect of the target music.

Alternatively, the sound effect playing module 202 is further configured to:

determine a target segment of the target music when the target music and the sound effect of the target music are played, wherein the target segment includes an unplayed music segment of the target music and a played music segment of the target music; and play the target segment of the target music and a sound effect corresponding to the target segment.

Alternatively, the apparatus may further include a music feature determination module and a sound effect determination module.

The music feature determination module is configured to determine a music feature of the target segment before the target segment of the target music and the sound effect corresponding to the target segment are played.

The sound effect determination module is configured to acquire a sound effect matching the music feature from at least two preset sound effects, and take the acquired sound effect as the sound effect of the target segment.

Alternatively, a music feature include a voice feature, a bass feature, an instrument feature, a genre, audio of different channels, or any combination thereof.

Alternatively, the visualized sound effect is three-dimensional.

Alternatively, the three-dimensional visualized sound effect may include at least two types of display units that are displayed in an overlapping manner. The display units have different directions of movement, and each of the display units includes at least one pixel.

Alternatively, a visualized sound effect formed by the at least two display units that are displayed in an overlapping manner includes at least one of a moving displayed object or a twinkling displayed object.

Alternatively, the apparatus may further include a first implementation module, a second implementation module and a third implementation module.

The first implementation module is configured to determine to implement the audio sound effect upon reception of a second operation instruction.

The second implementation module is configured to determine to implement the visualized sound effect upon reception of a third operation instruction.

The third implementation module is configured to determine to implement the audio sound effect and the visualized sound effect upon reception of a fourth operation instruction.

Alternatively, playing a sound effect of target music may include:

determining, based on the target music, first pieces of sub-audio corresponding to multiple space angles, respectively, wherein each space angle corresponds to one first piece of sub-audio; inputting each first piece of sub-audio into a filter corresponding to the space angle, such that a second piece of sub-audio of the space angle is obtained, wherein the filter is configured to convolve the first piece of sub-audio with a piece of preset audio corresponding to the space angle, such that the second piece of sub-audio corresponding to the space angle is obtained, and the piece of preset audio has an audio feature corresponding to a playing effect of the space angle; generating a synthetic sound effect based on multiple second pieces of sub-audio of the multiple space angles; and playing the synthetic sound effect.

Alternatively, the first sub-audio includes: left-channel audio of the target music, right-channel audio of the target music, a sum of the left-channel audio and the right-channel audio of the target music, and audio obtained after a difference between the left-channel audio and the right-channel audio of the target music is subjected to target processing.

Alternatively, the apparatus may further include:

a visualized sound effect display module, which is configured to display the visualized sound effect based on the space angle, wherein the visualized sound effect is configured to simulate a relationship between the synthetic sound effect and the space angle.

Alternatively, the visualized sound effect is displayed on a second interface of the music player, and the apparatus may further include:

a target music suspending module, which is configured to suspend playing the target music after the second interface is closed.

Alternatively, the first operation instruction includes a sliding operation instruction, and the first operation instruction receiving module 201 is further configured to:

receive the sliding operation instruction input into a preset area of the first interface.

The apparatus for playing a sound effect of music provided in the embodiment may be configured to execute the technical solutions of the method shown in FIG. 2 mentioned above, and has similar implementation principles and technical effects, which will not be repeated herein.

Figure 6:
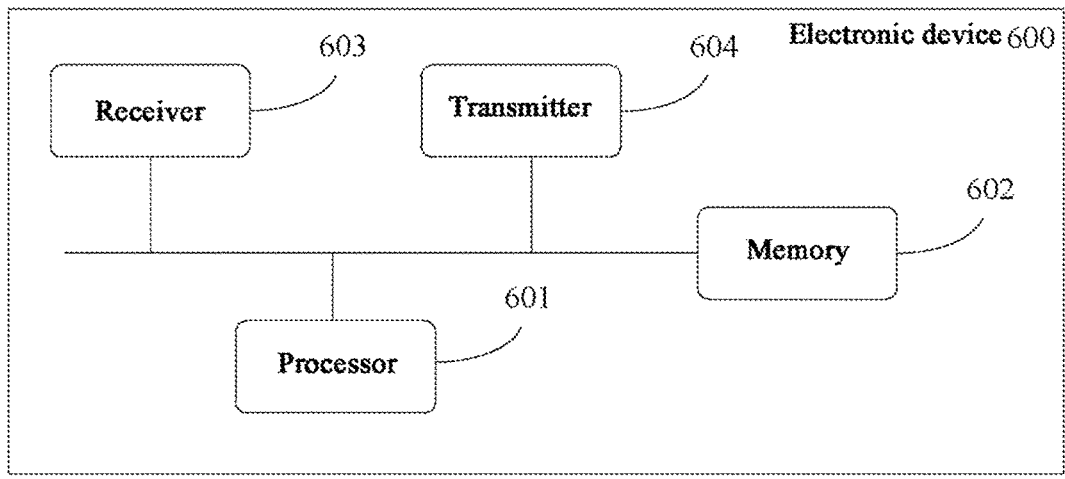
FIGS. 6 and 7 are structural block diagrams of two types of electronic devices according to embodiments of the present disclosure.

FIG. 6 is a structural block diagram of an electronic device 600 according to an embodiment of the present disclosure. The electronic device 600 includes a memory 602 and at least one processor 601.

The memory 602 stores computer-executable instructions.

The at least one processor 601 executes the computer-executable instructions stored in the memory 602, so as to cause the electronic device 600 to implement the method in FIG. 2 as described above.

In addition, the electronic device may further include a receiver 603 and a transmitter 604. The receiver 603 is configured to receive information from remaining device(s) or apparatus(es) and forward the information to the processor 601. The transmitter 604 is configured to transmit the information to the remaining device(s) or apparatus(es).

Figure 7:
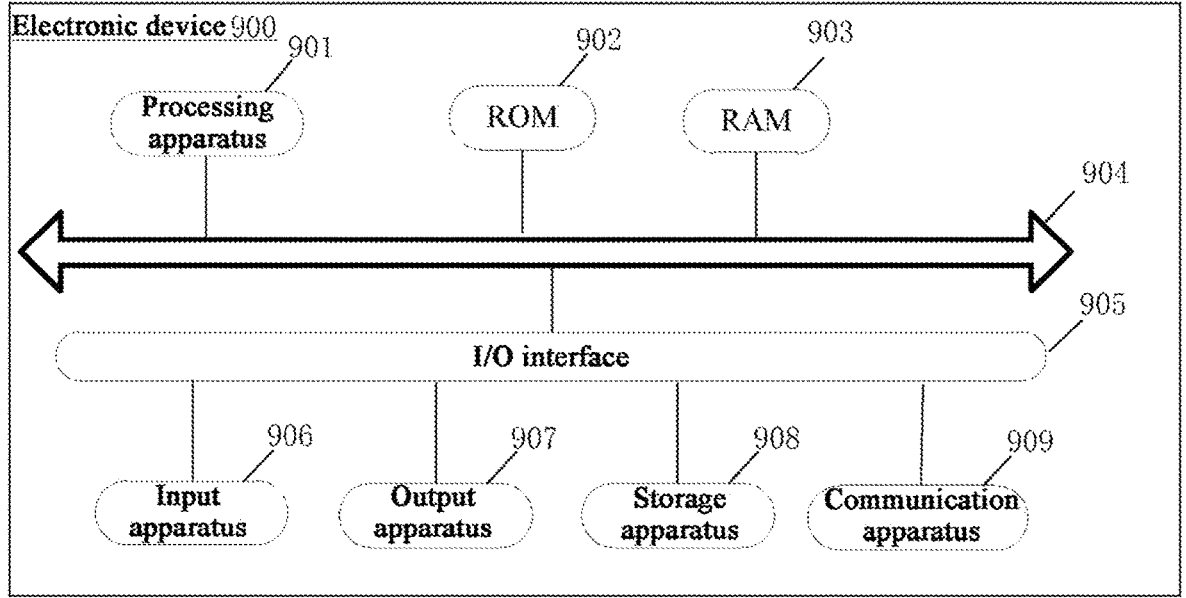

In addition, with reference to FIG. 7, a schematic structural diagram of an electronic device 900 suitable for being configured to implement an embodiment of the present disclosure is shown. The electronic device 900 may be a terminal device. The terminal device may include, but is not limited to, a mobile terminal such as a mobile phone, a notebook computer, a digital broadcast receiver, a personal digital assistant (called PDA for short), a portable android device (called PAD for short), a portable media player (called PMP for short) and an in-vehicle terminal (such as an in-vehicle navigation terminal), and a stationary terminal such as a digital television (called TV for short) and a desktop computer. The electronic device shown in FIG. 7 is merely an instance, and should not bring any limitation on functions and use scopes of the embodiments of the disclosure.

As shown in FIG. 7, the electronic device 900 may include a processing apparatus (such as a central processing unit, a graphics processor, etc.) 901 that may execute various appropriate actions and processing based on programs stored in a read only memory (called ROM for short) 902 or loaded into a random access memory (called RAM for short) 903 from a storage apparatus 908. In the RAM 903, various programs and data required for operations of the electronic device 900 are further stored. The processing apparatus 901, the ROM 902 and the RAM 903 are connected to each other through a bus 904. An input/output (called I/O for short) interface 905 is further connected to bus 904.

Generally, the following apparatuses may be connected to the I/O interface 905: an input apparatus 906 including a touch screen, a touch pad, a keyboard, a mouse, a camera, a microphone, an accelerometer, a gyroscope, etc.; an output apparatus 907 including a liquid crystal display (called LCD for short), a speaker, a vibrator, etc.; a storage apparatus 908 including a magnetic tape and a hard disk; and a communication apparatus 909. The communication apparatus 909 may allow the electronic device 900 to be in wireless or wired communication with other device(s) for data exchange. Although FIG. 7 shows an electronic device 900 having various apparatuses, it should be understood that not all of the shown apparatuses are required to be implemented or provided. More or fewer apparatuses may be alternatively implemented or provided.

In particular, according to an embodiment of the present disclosure, the process described above with reference to a flow diagram may be implemented as a computer software program. For instance, an embodiment of the present disclosure may include a computer program product. The computer program product includes a computer program carried on a computer-readable medium, and the computer program includes a program code for executing the method shown in the flow diagram. In such an embodiment, the computer program may be downloaded from a network by means of a communication apparatus 909 and mounted, or mounted from a storage apparatus 908, or mounted from the ROM 902. When executed by the processing apparatus 901, the computer program executes the above functions defined in a method in an embodiment of the present disclosure.

It should be noted that the above computer-readable medium in the present disclosure may be a computer-readable signal medium, a computer-readable storage medium, or any combination thereof. The computer-readable storage medium may include, but is not limited to, electronic, magnetic, optical, electromagnetic, infrared or semiconductor systems, apparatuses or devices, or any combination of the foregoing. More particular instances of the computer-readable storage medium may include, but is not limited to, an electrical connection based on one or more wires, a portable computer disk, a hard disk, a random access memory (RAM), a read-only memory (ROM), an erasable programmable read-only memory (called EPROM or a flash memory for short), an optical fiber, a portable compact disk read only memory (called CD-ROM for short), an optical storage device, a magnetic storage device, or any suitable combination of the forgoing. In the present disclosure, a computer-readable storage medium may be any tangible medium that may include, or store a program that may be used by or in connection with an instruction execution system, apparatus or device. In the present disclosure, a computer-readable signal medium may include a data signal propagated in a baseband or as part of a carrier wave, and a computer-readable program code is carried in the data signal. Such a propagated data signal may employ multiple forms, which include, but are not limited to, an electromagnetic signal, an optical signal or any suitable combination of the foregoing. The computer-readable signal medium may also be any computer-readable medium rather than a computer-readable storage medium, and may send, propagate or transmit a program that is used by or in combination with an instruction execution system, apparatus or device. The program code included in the computer-readable medium may be transmitted by means of any appropriate media, which include, but are not limited to, a wire, an optical fiber cable, a radio frequency (called RF for short), etc., or any suitable combination of the foregoing.

The above computer-readable medium may be included in the above electronic device, and may exist independently without being assembled into the electronic device.

The above computer-readable medium carries one or more programs, and when the one or more programs are executed by the electronic device, the electronic device executes the method shown in the above example.

The computer program code for executing an operation of the disclosure may be written in one or more programming languages or a combination thereof. The above programming languages include object oriented programming languages such as Java, Smalltalk and C++, and conventional procedural programming languages such as a "C" language or similar programming languages. The program code may be executed entirely on a user computer, executed partially on the user computer, executed as a stand-alone software package, executed partially on the user computer and partially on a remote computer, or executed entirely on the remote computer or a server. In a case that the remote computer is involved, the remote computer may be connected to the user computer by means of any type of network, which include a local area network (called LAN for short) or a wide area network (called WAN for short), or may be connected to an external computer (for instance, by means of the internet by an internet service provider).

Flow diagrams and block diagrams in figures show system architectures, functions and operations, which may be implemented according to systems, methods and computer program products in various embodiments of the disclosure. In this regard, each block in flow diagrams or block diagrams may represent a module, a program segment, or part of a code, which include one or more executable instructions for implementing specified logical functions. It should also be noted that in some alternative implementations, functions noted in blocks may also occur in sequences different from those in figures. For instance, functions represented by two continuous blocks may be executed substantially in parallel in practice, and sometimes implemented in reverse sequences, which depends on the involved functions. It should also be noted that each block in flow diagrams and/or block diagrams, and combinations of the blocks in the flow diagrams and/or the block diagrams, may be implemented by means of dedicated hardware-based systems that execute specified functions or operations, or may be implemented by means of combinations of dedicated hardware and computer instructions.

Units described in embodiments of the present disclosure may be implemented in a form of software or hardware. In some cases, a name of a unit does not constitute a limitation on the unit itself. For instance, the first acquisition unit may also be described as "a unit acquiring at least two internet protocol addresses."

At least part of the functions described above herein may be executed by one or more hardware logic components. For instance, without limitation, exemplary types of hardware logic components that may be used may include a field programmable gate array (called FPGA for short), an application specific integrated circuit (called ASIC for short), an application specific standard product (called ASSP for short), system on chip (called SOC for short), a complex programmable logic device (called CPLD for short), etc.

In a context of the disclosure, a machine-readable medium may be a tangible medium, which may include or store a program for being used by or in connection with an instruction execution system, apparatus or device. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices, or any suitable combination of the foregoing. More specific instances of the machine-readable storage medium may include an electrical connection based on one or more wires, a portable computer disk, a hard disk, a random-access memory (RAM), a read-only memory (ROM), an erasable programmable read-only memory (EPROM or a flash memory), an optical fiber, a compact disk read-only memory (CD-ROM), an optical storage device, a magnetic storage device or any suitable combination of the foregoing.

In a first instance of a first aspect, an embodiment of the present disclosure provides a method for playing a sound effect of music. The method includes:

receiving a first operation instruction on a first interface, wherein the first interface includes an interface configured to play music in a music player; and playing a sound effect of target music in response to the first operation instruction, wherein the sound effect includes an associated audio sound effect and visualized sound effect.

Based on the first instance of the first aspect, in a second instance of the first aspect, the step of playing the sound effect of target music in response to the first operation instruction includes:

determining music that is suspended from being played as the target music in response to the first operation instruction; and playing the target music and the sound effect of the target music.

Based on the second instance of the first aspect, in a third instance of the first aspect, the step of playing the target music and the sound effect of the target music includes:

determining a target segment of the target music, wherein the target segment includes an unplayed music segment of the target music and a played music segment of the target music; and playing the target segment of the target music and a sound effect corresponding to the target segment.

Based on the third instance of the first aspect, in a fourth instance of the first aspect, before the step of playing the target segment of the target music and the sound effect corresponding to the target segment, the method further includes:

determining a music feature of the target segment; and acquiring a sound effect matching the music feature from at least two preset sound effects, and taking the acquired sound effect as the sound effect of the target segment.

Based on the fourth instance of the first aspect, in a fifth instance of the first aspect, the music feature includes a voice feature, a bass feature, an instrument feature, a genre, or audio of different channels.

Based on any one of the first to fifth instances of the first aspect, in a sixth instance of the first aspect, the visualized sound effect is three-dimensional.

Based on the sixth instance of the first aspect, in a seventh instance of the first aspect, the three-dimensional visualized sound effect includes at least two types of display units that are displayed in an overlapping manner, wherein the display units have different directions of movement, and each of the display unit includes at least one pixel.

Based on the seventh instance of the first aspect, in an eighth instance of the first aspect, a visualized sound effect formed by the at least two display units that are displayed in the overlapping manner includes at least one of a moving displayed object or a twinkling displayed object.

Based on any one of the first to fifth instances of the first aspect, in a ninth instance of the first aspect, the method further includes:

determining to implement the audio sound effect upon reception of a second operation instruction;

determining to implement the visualized sound effect upon reception of a third operation instruction; and determining to implement the audio sound effect and the visualized sound effect upon reception of a fourth operation instruction.

Based on any one of the first to fifth instances of the first aspect, in a tenth example of the first aspect, the step of playing the sound effect of target music includes:

determining, based on the target music, first pieces of sub-audio corresponding to a plurality of space angles respectively, wherein each space angle corresponds to one first piece of sub-audio;

inputting each first piece of sub-audio into a filter corresponding to the space angle, such that a second piece of sub-audio of the space angle is obtained, wherein the filter is configured to convolve the first piece of sub-audio with a piece of preset audio corresponding to the space angle, such that the second piece of sub-audio corresponding to the space angle is obtained, and the piece of preset audio has an audio feature corresponding to a playing effect of the space angle;

generating a synthetic sound effect based on multiple second pieces of sub-audio of the plurality of space angles; and playing the synthetic sound effect.

Based on the tenth instance of the first aspect, in an eleventh instance of the first aspect, the first piece of sub-audio includes left-channel audio of the target music, right-channel audio of the target music, a sum of the left-channel audio and the right-channel audio of the target music, and audio obtained after a difference between the left-channel audio and the right-channel audio of the target music is subjected to target processing.

Based on the tenth instance of the first aspect, in a twelfth instance of the first aspect, the method further includes:

displaying the visualized sound effect based on the space angle, wherein the visualized sound effect is configured to simulate a relationship between the second piece of sub-audio and the space angle.

Based on any one of the first to fifth instances of the first aspect, in a thirteenth instance of the first aspect, the visualized sound effect is displayed on a second interface of the music player, and the method further includes:

suspending playing the target music after the second interface is closed.

Based on any one of the first to fifth instances of the first aspect, in a fourteenth instance of the first aspect, the first operation instruction includes a sliding operation instruction, and the step of receiving the first operation instruction on a first interface includes:

receiving the sliding operation instruction input into a preset area of the first interface.

In a first instance of a second aspect, an apparatus for playing a sound effect of music is provided. The apparatus includes:

a first operation instruction receiving module, which is configured to receive a first operation instruction on a first interface, wherein the first interface includes an interface configured to play music in a music player; and a sound effect playing module, which is configured to play a sound effect of target music in response to the first operation instruction, wherein the sound effect includes an associated audio sound effect and visualized sound effect.

Based on the first instance of the second aspect, in a second instance of the second aspect, the sound effect playing module is further configured to:

determine music that is suspended from being played as the target music in response to the first operation instruction; and play the target music and the sound effect of the target music.

Based on the second instance of the second aspect, in a third instance of the second aspect, the sound effect playing module is further configured to:

determine a target segment of the target music when the target music and the sound effect of the target music are played, wherein the target segment includes an unplayed music segment of the target music and a played music segment of the target music; and play the target segment of the target music and a sound effect corresponding to the target segment.

Based on the third instance of the second aspect, in a fourth instance of the second aspect, the apparatus further includes:

a music feature determination module, which is configured to determine a music feature of the target segment before the target segment of the target music and the sound effect corresponding to the target segment are played; and a sound effect determination module, which is configured to acquire a sound effect matching the music feature from at least two preset sound effects, and take the acquired sound effect as the sound effect of the target segment.

Based on the fourth instance of the second aspect, in a fifth instance of the second aspect, the music feature may include a voice feature, a bass feature, an instrument feature, a genre, or audio of different channels.

Based on any one of the first to fifth instances of the second aspect, in a sixth instance of the second aspect, the visualized sound effect is three-dimensional.

Based on the sixth instance of the second aspect, in a seventh instance of the second aspect, the three-dimensional visualized sound effect includes at least two types of display units that are displayed in an overlapping manner, wherein the display units have different directions of movement, and each of the display units includes at least one pixel.

Based on the seventh instance of the second aspect, in an eighth instance of the second aspect, a visualized sound effect formed by the at least two display units that are displayed in the overlapping manner includes at least one of a moving displayed object or a twinkling displayed object.

Based on any one of the first to fifth instances of the second aspect, in a ninth instance of the second aspect, the apparatus further includes:

a first implementation module, which is configured to determine to implement the audio sound effect upon reception of a second operation instruction;

a second implementation module, which is configured to determine to implement the visualized sound effect upon reception of a third operation instruction; and a third implementation module, which is configured to determine to implement the audio sound effect and the visualized sound effect upon reception of a fourth operation instruction.

Based on any one of the first to fifth instances of the second aspect, in a tenth instance of the second aspect, the sound effect playing module is further configured to:

play the sound effect of the target music, which includes:

determine, based on the target music, first pieces of sub-audio corresponding to a plurality of space angles respectively, wherein each space angle corresponds to one first piece of sub-audio;

input each first piece of sub-audio into a filter corresponding to the space angle, such that a second piece of sub-audio of the space angle is obtained, wherein the filter is configured to convolve the first piece of sub-audio with a piece of preset audio corresponding to the space angle, such that the second piece of sub-audio corresponding to the space angles is obtained, and the piece of preset audio has an audio feature corresponding to a playing effect of the space angle;

generate a synthetic sound effect based on multiple second pieces of sub-audio of the plurality of space angles; and play the synthetic sound effect.

Based on the tenth instance of the second aspect, in an eleventh instance of the second aspect, the first piece of sub-audio includes left-channel audio of the target music, right-channel audio of the target music, a sum of the left-channel audio and the right-channel audio of the target music, and audio obtained after a difference between the left-channel audio and the right-channel audio of the target music is subjected to target processing.

Based on the tenth instance of the second aspect, in a twelfth instance of the second aspect, the apparatus further includes:

a visualized sound effect display module, which is configured to display the visualized sound effect based on the space angle, wherein the visualized sound effect is configured to simulate a relationship between the second piece of sub-audio and the space angle.

Based on any one of the first to fifth instances of the second aspect, in a thirteenth instance of the second aspect, the visualized sound effect is displayed on a second interface of the music player, and the apparatus further includes:

a target music suspending module, which is configured to suspend playing the target music after the second interface is closed.

Based on any one of the first to fifth instances of the second aspect, in a fourteenth instance of the second aspect, the first operation instruction includes a sliding operation instruction, and the first operation instruction receiving module is further configured to:

receive the sliding operation instruction input into a preset area of the first interface.

In a third aspect, according to one or more embodiments of the present disclosure, an electronic device is provided. The electronic device includes: at least one processor and a memory; wherein the memory stores computer-executable instructions; and the at least one processor executes the computer-executable instructions stored in the memory, so as to cause the electronic device to implement any one of the methods described in the first aspect.

In a fourth aspect, according to one or more embodiments of the present disclosure, a computer-readable storage medium is provided. The computer-readable storage medium stores computer-executable instructions, wherein a processor, when executes the computer-executable instruction, causes an electronic device to implement any one of the methods described in the first aspect.

In a fifth aspect, according to one or more embodiments of the present disclosure, a computer program product is provided. The computer program product includes a computer program, where the computer program, when being executed by a processor, implements any one of the methods described in the first aspect.

In a sixth aspect, according to one or more embodiments of the present disclosure, a computer program is provided. The computer program, when being executed by a processor, is configured to implement any one of the methods described in the first aspect.

The above description is only illustrative of preferred embodiments of the present disclosure and employed technical principles. Those skilled in the art should understand that the scope involved in the present disclosure is not limited to technical solutions formed by a specific combination of the above technical features, and should also cover other technical solutions formed by any combination of the above technical features or their equivalent features without departing from the inventive concept, such as technical solutions formed by interchanging the above features and (non-limitative) technical features having similar functions as disclosed in the present disclosure.

Moreover, although various operations are depicted in a specific order, it should not be understood that these operations are required to be executed in a shown specific order or in a sequential order. In certain circumstances, multitasking and parallel processing may be advantageous. Similarly, although several specific implementation details are included in the above discussion, these details should not be construed as limitations on the scope of the present disclosure. Some features described in contexts of separate examples can also be implemented in combination in a single embodiment. Conversely, various features described in a context of a single embodiment can also be implemented in multiple embodiments separately or in any suitable sub-combination.

Although the subject matter is described in language specific to structural features and/or methodological logical actions, it should be understood that the subject matter defined in the appended claims is not necessarily limited to the specific features or actions described above. Conversely, the specific features and actions described above are merely instance forms for implementing the claims.

What is claimed is:

1. A method for playing a sound effect of music, comprising:

receiving a first operation instruction on a first interface, wherein the first interface comprises an interface configured to play music in a music player; and playing a sound effect of target music in response to the first operation instruction, wherein the sound effect comprises an audio sound effect and a visualized sound effect that are associated with the target music, wherein the visualized sound effect is three-dimensional, and wherein the three-dimensional visualized sound effect comprises at least two types of display units that are displayed in an overlapping manner, wherein the display units have different directions of movement, and each of the display units comprises at least one pixel.

2. The method according to claim 1, wherein playing the sound effect of the target music in response to the first operation instruction comprises:

in response to the first operation instruction, determining music that is suspended from being played as the target music; and playing the target music and the sound effect of the target music.

3. The method according to claim 2, wherein playing the target music and the sound effect of the target music comprises:

determining a target segment of the target music, wherein the target segment comprises an unplayed music segment of the target music and a played music segment of the target music; and playing the target segment of the target music and a sound effect corresponding to the target segment.

4. The method according to claim 3, wherein the method further comprises, before playing the target segment of the target music and a sound effect corresponding to the target segment:

determining a music feature of the target segment; and acquiring a sound effect matching the music feature from at least two preset sound effects, and taking the acquired sound effect as the sound effect of the target segment.

5. The method according to claim 4, wherein the music feature comprises a voice feature, a bass feature, an instrument feature, a genre, or audio of different channels.

6. The method according to claim 1, wherein the visualized sound effect formed by the at least two types of display units that are displayed in the overlapping manner comprises at least one of a moving displayed object or a twinkling displayed object.

7. The method according to claim 1, further comprising:

determining to implement the audio sound effect upon reception of a second operation instruction;

determining to implement the visualized sound effect upon reception of a third operation instruction; and determining to implement the audio sound effect and the visualized sound effect upon reception of a fourth operation instruction.

8. The method according to claim 1, wherein playing the sound effect of the target music comprises:

determining, based on the target music, first pieces of sub-audio corresponding to a plurality of space angles respectively, wherein each space angle corresponds to one first piece of sub-audio;

inputting each first piece of sub-audio into a filter corresponding to the space angle, such that a second piece of sub-audio of the space angle is obtained, wherein the filter is configured to convolve the first piece of sub-audio with a piece of preset audio corresponding to the space angle, such that the second piece of sub-audio corresponding to the space angle is obtained, and the piece of preset audio has an audio feature corresponding to a playing effect of the space angle;

generating a synthetic sound effect based on a plurality of second pieces of sub-audio of the plurality of space angles; and playing the synthetic sound effect.

9. The method according to claim 8, wherein the first piece of sub-audio comprises left-channel audio of the target music, right-channel audio of the target music, a sum of the left-channel audio and the right-channel audio of the target music, and audio obtained after a difference between the left-channel audio and the right-channel audio of the target music is subjected to target processing.

10. The method according to claim 8, further comprising:

displaying the visualized sound effect based on the space angle, wherein the visualized sound effect is configured to simulate a relationship between the second piece of sub-audio and the space angle.

11. The method according to claim 1, wherein the visualized sound effect is displayed on a second interface of the music player, and the method further comprises:

suspending playing the target music after the second interface is closed.

12. The method according to claim 1, wherein the first operation instruction comprises a sliding operation instruction, and the receiving the first operation instruction on the first interface comprises:

receiving the sliding operation instruction input into a preset area of the first interface.

13. An electronic device, comprising at least one processor and a memory; wherein the memory stores computer-executable instructions; and wherein the at least one processor executes the computer-executable instructions stored in the memory, to cause the electronic device to:

receive a first operation instruction on a first interface, wherein the first interface comprises an interface configured to play music in a music player; and play a sound effect of target music in response to the first operation instruction, wherein the sound effect comprises an audio sound effect and a visualized sound effect that are associated with the target music, wherein the visualized sound effect is three-dimensional, and wherein the three-dimensional visualized sound effect comprises at least two types of display units that are displayed in an overlapping manner, wherein the display units have different directions of movement, and each of the display units comprises at least one pixel.

14. A non-transitory computer-readable storage medium, storing computer-executable instructions that, when executed, causes a processor to:

receive a first operation instruction on a first interface, wherein the first interface comprises an interface configured to play music in a music player; and play a sound effect of target music in response to the first operation instruction, wherein the sound effect comprises an audio sound effect and a visualized sound effect that are associated with the target music, wherein the visualized sound effect is three-dimensional, and wherein the three-dimensional visualized sound effect comprises at least two types of display units that are displayed in an overlapping manner, wherein the display units have different directions of movement, and each of the display units comprises at least one pixel.

15. The electronic device of claim 13, wherein the electronic device to is caused to play the sound effect of the target music in response to the first operation instruction by:

in response to the first operation instruction, determining music that is suspended from being played as the target music; and playing the target music and the sound effect of the target music.

16. The electronic device of claim 13, wherein the electronic device is further caused to:

determine to implement the audio sound effect upon reception of a second operation instruction;

determine to implement the visualized sound effect upon reception of a third operation instruction; and determine to implement the audio sound effect and the visualized sound effect upon reception of a fourth operation instruction.

17. The electronic device of claim 13, wherein the electronic device is caused to play the sound effect of the target music by:

determining, based on the target music, first pieces of sub-audio corresponding to a plurality of space angles respectively, wherein each space angle corresponds to one first piece of sub-audio;

inputting each first piece of sub-audio into a filter corresponding to the space angle, such that a second piece of sub-audio of the space angle is obtained, wherein the filter is configured to convolve the first piece of sub-audio with a piece of preset audio corresponding to the space angle, such that the second piece of sub-audio corresponding to the space angle is obtained, and the piece of preset audio has an audio feature corresponding to a playing effect of the space angle;

generating a synthetic sound effect based on a plurality of second pieces of sub-audio of the plurality of space angles; and playing the synthetic sound effect.

* * * * *